United States Patent
Manai et al.

(10) Patent No.: US 7,656,121 B2
(45) Date of Patent: Feb. 2, 2010

(54) SOFT TRANSITION FROM CONSTANT-CURRENT TO A CONSTANT-VOLTAGE MODE IN A BATTERY CHARGER

(75) Inventors: Bilal Manai, Aix en Provence (FR); Xavier Rabeyrin, rue de la republique (FR)

(73) Assignee: Atmel Corporation, San Jose, CA (US)

( * ) Notice: Subject to any disclaimer, the term of this patent is extended or adjusted under 35 U.S.C. 154(b) by 337 days.

(21) Appl. No.: 11/677,708

(22) Filed: Feb. 22, 2007

(65) Prior Publication Data

US 2008/0203974 A1 Aug. 28, 2008

(51) Int. Cl.
*H01M 10/46* (2006.01)
(52) U.S. Cl. ...................................... 320/125
(58) Field of Classification Search ................ 320/107, 320/125, 128, 130, 158, 159, 163
See application file for complete search history.

(56) References Cited

U.S. PATENT DOCUMENTS

| | | | | |
|---|---|---|---|---|
| 3,114,055 A | * | 12/1963 | Kalfaian | 327/133 |
| 4,647,834 A | * | 3/1987 | Castleman | 320/141 |
| 5,304,917 A | * | 4/1994 | Somerville | 320/148 |
| 5,637,981 A | | 6/1997 | Nagai et al. | |
| 6,570,372 B2 | | 5/2003 | Barcelo et al. | |
| 7,030,591 B2 | | 4/2006 | Stellberger | |
| 2006/0113966 A1 | | 6/2006 | Chen | |

FOREIGN PATENT DOCUMENTS

| | | |
|---|---|---|
| EP | 1049229 A1 | 11/2000 |
| EP | 1049230 A1 | 11/2000 |
| JP | 2006-204021 | 8/2006 |
| WO | WO-2008103465 A1 | 8/2008 |

OTHER PUBLICATIONS

Lima et al., A Novel Universal Battery Charger for NiCd, NiMH, Li-Ion and Li-Polymer, 2003, pp. 209-212, 0-7803-8108-4/03.
"International Application Serial No. PCT/US2008/002385, International Search Report and Written Opinion mailed on Jul. 24, 2008", 12 pages.

* cited by examiner

*Primary Examiner*—Edward Tso
(74) *Attorney, Agent, or Firm*—Schwegman, Lundberg & Woessner, P.A.

(57) ABSTRACT

A system and method for charging a battery. In one embodiment, the system includes a charging circuit that charges the battery with a constant current during a first phase and charges the battery with a constant voltage during a second phase. The system also includes a control circuit for minimizing glitches when the charging transitions from the first phase to the second phase. According to the system and method disclosed herein, a battery may be charged in a controlled and reliable manner.

18 Claims, 15 Drawing Sheets

300

SOFT TRANSITION FROM CONSTANT-CURRENT TO A CONSTANT-VOLTAGE MODE IN A BATTERY CHARGER

FIELD OF THE INVENTION

The present invention relates generally to batteries, and more particularly to a battery charger for use with such batteries.

BACKGROUND OF THE INVENTION

Battery chargers are well known. When charging a battery, a battery charger may operate in a constant-current mode, where the battery charger provides a constant current to charge the battery. The battery charger may also operate in a constant-voltage mode, where the battery charger provides a constant voltage to charge the battery. A problem with conventional battery chargers is that when the battery transitions from a constant-current mode to a constant-voltage mode, the battery charger may experience significantly large increases in charge current. Unfortunately, large charge currents may cause irreversible damage to the battery charger if its package is not able to dissipate the excess power. Accordingly, what is needed is an improved system and method for charging a battery. The present invention addresses such a need.

SUMMARY OF THE INVENTION

A system and method for charging a battery is disclosed. In one embodiment, the system includes a charging circuit that charges the battery with a constant current during a first phase and charges the battery with a constant voltage during a second phase. The system also includes a control circuit for minimizing over-current glitches when the charging transitions from the first phase to the second phase. According to the system and method disclosed herein, a battery may be charged in a controlled and reliable manner.

DETAILED DESCRIPTION OF THE INVENTION

The present invention relates to integrated circuits, and more particularly to a battery charger. The following description is presented to enable one of ordinary skill in the art to make and use the invention, and is provided in the context of a patent application and its requirements. Various modifications to the preferred embodiment and the generic principles and features described herein will be readily apparent to those skilled in the art. Thus, the present invention is not intended to be limited to the embodiments shown, but is to be accorded the widest scope consistent with the principles and features described herein.

A system and method in accordance with the present invention for charging a battery are disclosed. The system includes a charging circuit that charges the battery with a constant current during a first phase, and charges the battery with a constant voltage during a second phase. The system also includes a control circuit that enables a smooth transition from the first phase (constant-current mode) to the second phase (constant-voltage mode) by minimizing current glitches and/or voltage glitches during the transition. The system also includes a limiting circuit that provides a dedicated control signal that limits excess voltage levels at a power transistor to avoid irreversible damage to the system. The dedicated signal may be generated by the control circuit. As a result, a battery may be charged in a controlled and reliable manner. To more particularly describe the features of the present invention, refer now to the following description in conjunction with the accompanying figures.

Although the present invention disclosed herein is described in the context of Li-Ion/Li-Poly batteries, the present invention may apply to other types of batteries requiring cccv charging techniques, and still remain within the spirit and scope of the present invention.

Basic Charging System

Figure 1:
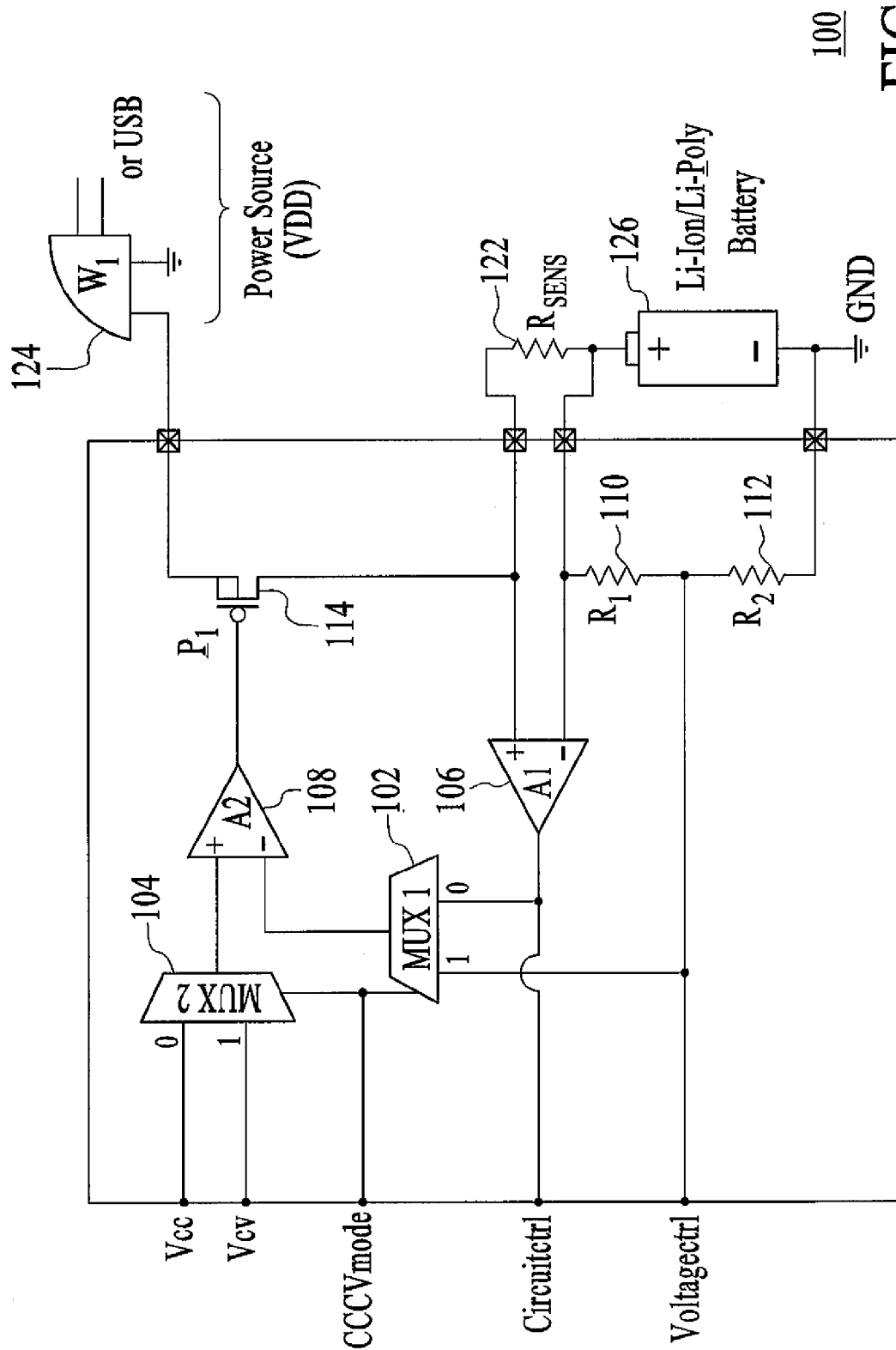
FIG. 1 is a schematic diagram of a charging system in accordance with one embodiment.

FIG. 1 is a schematic diagram of a charging system 100 in accordance with one embodiment. The charging system 100 includes multiplexers (muxes) 102 and 104. In one embodiment, the muxes 102 and 104 may be analog muxes. The charging system 100 also includes a constant-gain (GI) current-to-voltage converter 106 and an error amplifier 108. In one embodiment, the error amplifier 108 may have a very high gain. The charging system 100 also includes resistors 110 and 112. In one embodiment, the resistors 110 and 112 may be configured as a resistor bridge. The charging system 100 also includes a power transistor 114. In one embodiment, the transistor 114 is a metal-oxide semiconductor (MOS) transistor. The charging system 100 also includes a current sensing resistor 122. In one embodiment, the sensing device may be any appropriate device for measuring current. A power source 124 is coupled to the transistor 114. The power source may be any appropriate power source such as an alternating or direct current wall adapter or a universal serial bus (USB) port, etc. In one embodiment, a battery 126 may be coupled to the charging system as shown in FIG. 1. In one embodiment, the battery may be a li-ion/li-poly type battery. In operation, the charging system 100 charges the battery 126 with a constant-current constant-voltage (CCCV), as shown below in FIG. 2.

Figure 2:
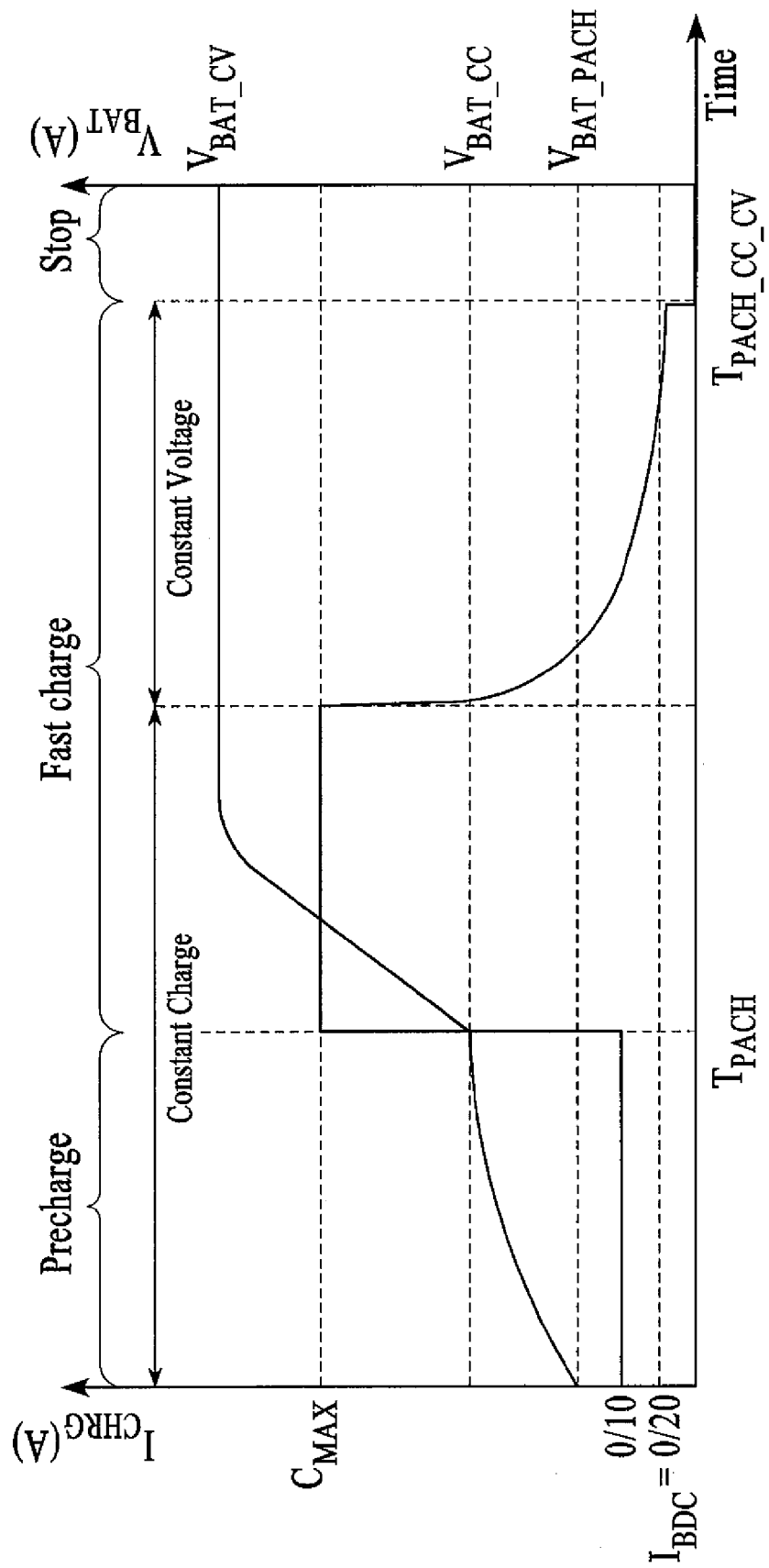
FIG. 2 is a graph showing an example of an ideal constant-current constant-voltage (CCCV) charging profile showing current and voltage versus time.

FIG. 2 is a graph showing an example constant-current constant-voltage (CCCV) charging profile showing current and voltage versus time. As FIG. 2 shows, the battery charging system generally applies a constant current (beginning at $T_{PRCH}$) to charge the battery from an initial voltage value (e.g., $V_{BAT\_CC}$=3V) to a nominal voltage value (e.g., $V_{BAT\_CV}$=4.2V). In one embodiment, the value of the applied charge current required to charge the battery is equal to the capacity of the battery. For example, if the battery capacity is 1 Ampere hour (Ah), a charge current of 1 Amp would be applied during 1 hour in order to charge the battery.

In one embodiment, the charging system 100 may utilize a precharge mode, where the battery is precharged with a constant current to a voltage between two given values (e.g., $V_{BAT\_PRCH}$=2.4V and $V_{BAT\_CC}$=3V). In such a scenario, in one embodiment, the constant current that is used may be 1/10th the battery capacity (e.g., 0.1 A=100 mA, assuming a 1 Ah battery capacity).

In one embodiment, when the battery voltage reaches a nominal voltage value (e.g., $V_{BAT\_CV}$=4.2V), a constant voltage may be applied to the battery. The charge current decreases to a predetermined value, referred to as an end-of-charge current value. At this moment, the battery is charged and the charging stops.

In one embodiment, the charging system 100 achieves the above-described charging characteristics using a constant-current circuit and a constant-voltage circuit, both of which are described in detail below.

Constant-Current Circuit

Figure 3:
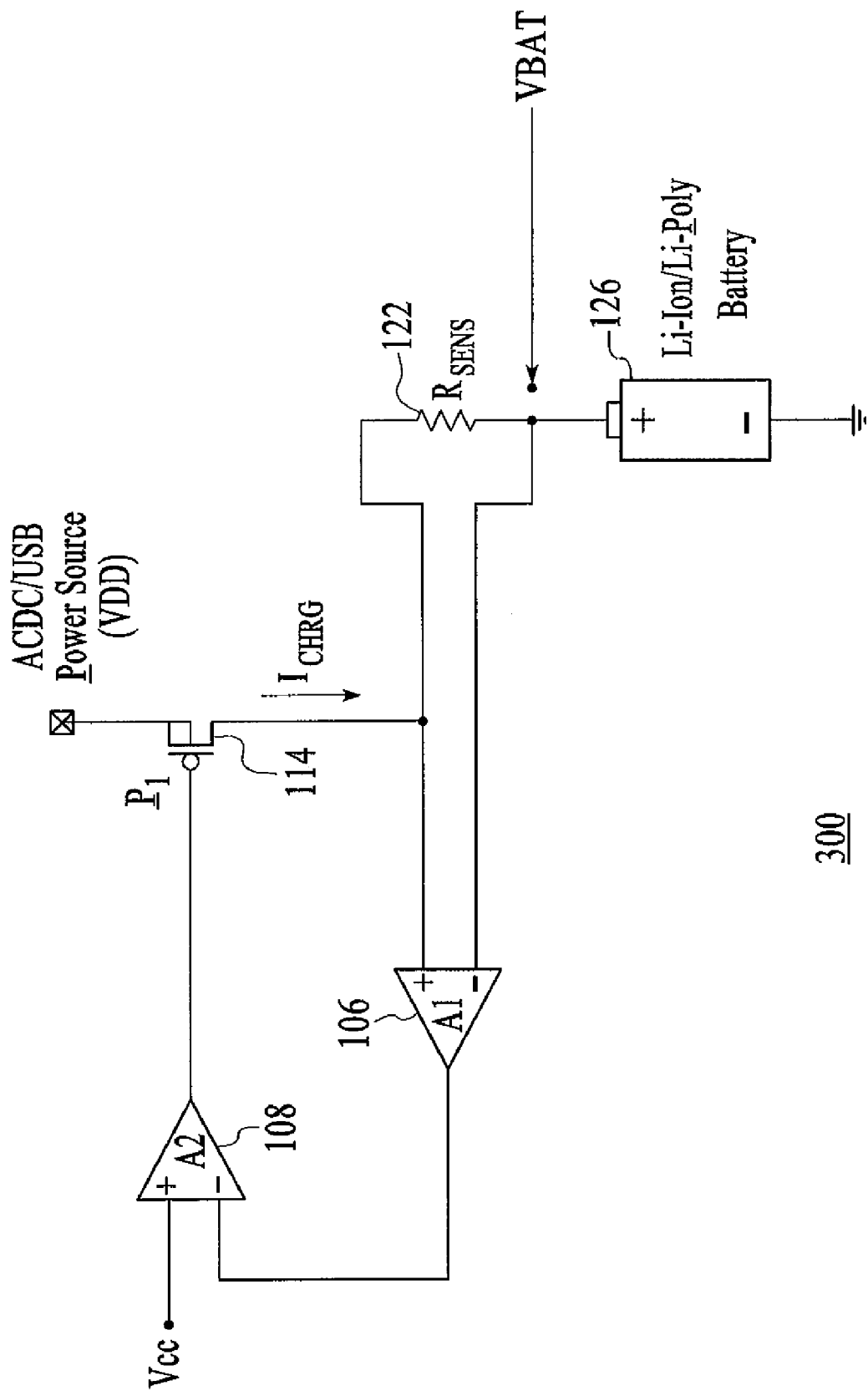
FIG. 3 is a schematic diagram of a constant-current circuit in accordance with one embodiment.

FIG. 3 is a schematic diagram of a constant-current circuit 300 in accordance with one embodiment. Referring to both FIGS. 1 and 3 together, the constant-current circuit 300 includes the transistor 114, the current sensing resistor 122, current-to-voltage converter 106, and the error amplifier 108.

In operation, generally, the constant-current circuit 300 maintains a constant charge current that charges the battery 126. The constant-current circuit 300 performs this function by sensing the charge current $I_{CHRG}$ at the current sensing resistor 122 and adjusts charge current $I_{CHRG}$ to keep it constant. More specifically, the transistor 114 provides a charge current $I_{CHRG}$ to the battery 126 via the current sensing resistor 126. More specifically, the current sensing resistor 122 produces a voltage based on the charge current $I_{CHRG}$. The current-to-voltage converter 106 then receives the voltage differential across the current sensing resistor 122 and outputs a gain to an input of the error amplifier 108. In one embodiment, the error amplifier 108 maintains equality between a voltage of a constant current $V_{CC}$ and the output gain of the current-to-voltage converter 106. The error amplifier 108 drives the transistor 114 in order to maintain a constant charge current $I_{CHRG}$.

Figure 4:
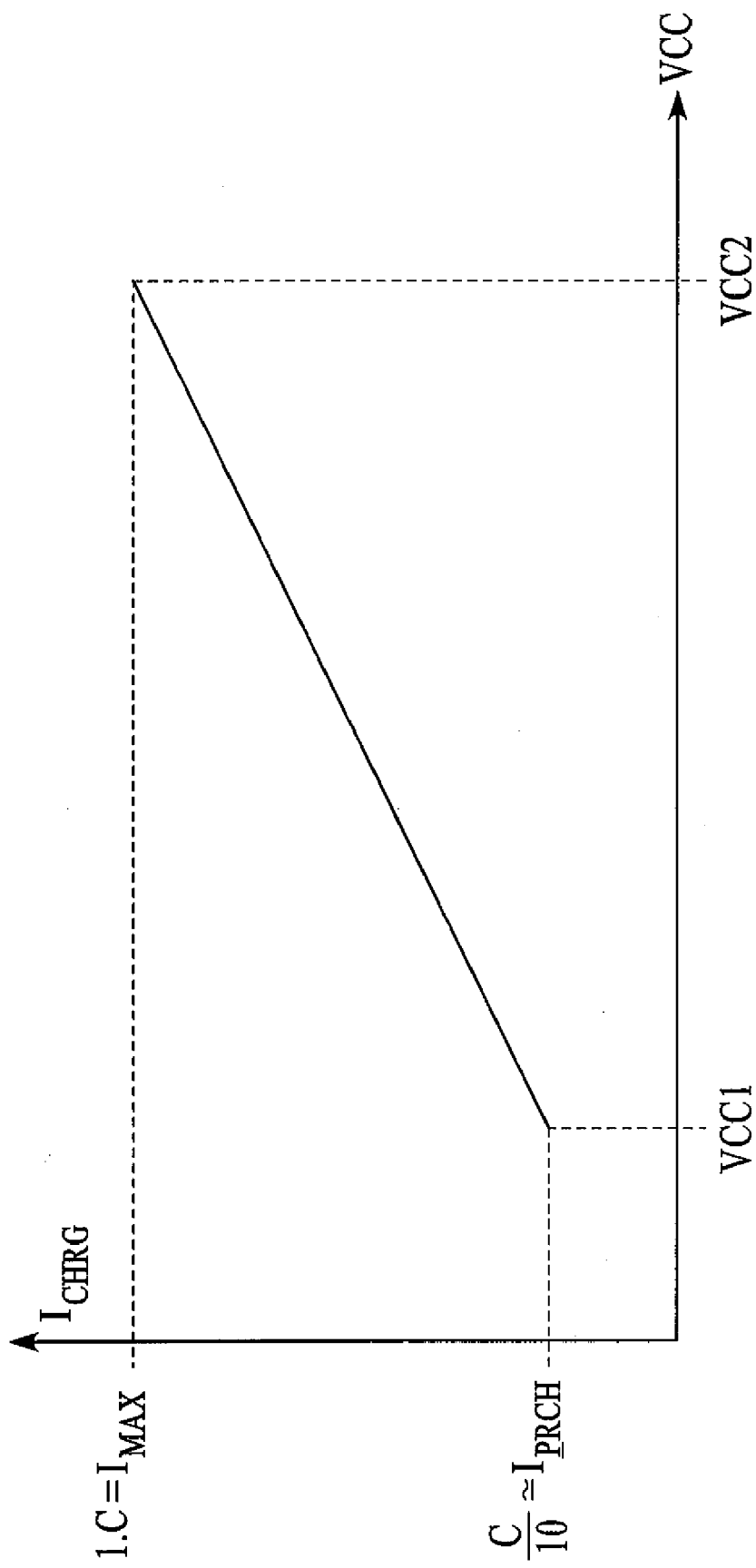
FIG. 4 is a graph showing example charging results from the constant-current circuit of FIG. 3.

FIG. 4 is a graph showing example charging results from the constant-current circuit of FIG. 3. As FIG. 4 shows, the constant-current circuit 300 applies a charge current $I_{CHRG}$ that is proportional to $V_{CC}$ in order to charge the battery 126 from one voltage $V_{BAT\_CC1}$ or $V_{BAT\_CC2\ to\ VBAT\_CV}$. $V_{CC1}$ and $V_{CC2}$ are voltage corresponding to two charging current $I_{CHRG1}$ and $I_{CHRG2}$. They are voltage controls that provide a given charging current $I_{CHRG}$ from $I_{PRCH}$=C/10 to $I_{CHRGMAX}$=1C.

Constant-Voltage Circuit

Figure 5:
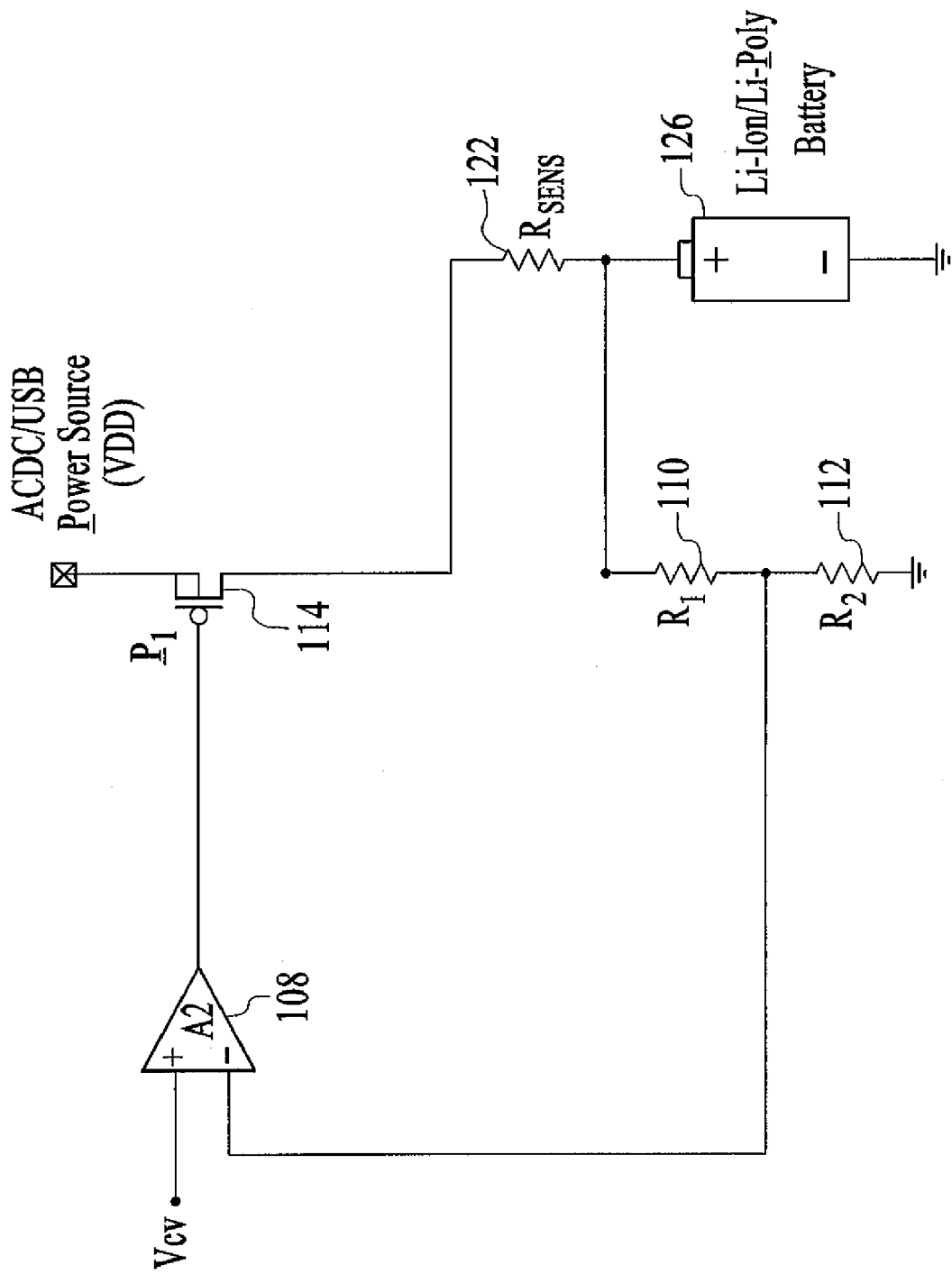
FIG. 5 shows a schematic diagram of a constant-voltage circuit in accordance with one embodiment.

FIG. 5 shows a schematic diagram of a constant-voltage circuit 500 in accordance with one embodiment. Referring to both FIGS. 1 and 5 together, the constant-current circuit 500 includes the transistor 114, the current sensing resistor 122, the resistors 110 and 112, and the error amplifier 108. In one embodiment, the current sensing resistor 122 happens to be a part of this constant-voltage circuit 300 but does not provide a significant contribution to the functionality of the circuit loop. In one embodiment, the resistors 110 and 112 are configured as a voltage divider, which operates according to the equation:

$$V_{BAT}*R2/(R1+R2)=V_{CV}.$$

In operation, generally, the constant-voltage circuit 500 maintains a constant charge voltage that charges the battery 126. The error amplifier 108 ensures equality between a constant voltage $V_{CV}$ and the voltage resulting from the voltage divider of resistors 110 and 112. In one embodiment, the constant voltage $V_{CV}$ may be a reference voltage provided by any appropriate voltage source (e.g., a band-gap voltage source). The error amplifier 108 drives the transistor 114 in order to maintain a constant charge voltage $V_{BAT}$. The resulting behavior of the constant-voltage circuit 500 resembles the resulting behavior of a linear regulator.

Constant Current Constant Voltage Circuit

Referring again to FIG. 1, in one embodiment, the voltage control potential voltagectrl may be continuously monitored (e.g., by an analog-to-digital converter (ADC), a comparator, or any appropriate processor). If the value of voltage control potential voltagectrl falls below $V_{CV}$ (voltagectrl is the image of $V_{BAT}$ via resistor bridge), the signal cccvmode, which controls the muxes 102 and 104, goes to a logical "0." This selects $V_{CC}$ as the output for the mux 104 and selects the current signal currentctrl as the output for the mux 102. As a result, the constant-current circuit 300 (FIG. 3) becomes active. When voltage across the battery $V_{BAT}$ reaches $V_{BAT\_CV}$=4.2 v and the signal voltagectrl reaches $V_{CV}$ (e.g., 1.200V band-gap voltage), the signal cccvmode goes to a logical "1." This selects $V_{CV}$ as the output for the mux 104, and selects the signal voltagectrl as an output for the mux 102. As a result, a constant-voltage circuit 500 becomes active.

Just before the transition from constant-current mode to constant-voltage mode, the mux 104 output is $V_{CC}$ and mux 102 output is currentctrl, which is higher than $V_{CV}$=1.200V. The error amplifier 108 ensures equality between $V_{CC}$ and currentctrl signal, and drives the transistor 114 such that it produces a charge current equal to $I_{CHRG}$=1C.

In one embodiment, during transition from a constant-current mode to a constant-voltage mode, and when the signal cccvmode goes from a logical "0" to a logical "1," constant-current circuit 300 becomes inactive. In one embodiment, the constant-voltage circuit 500 does not become active immediately, since it requires some time to become activated and to stabilize. When the transition occurs, the inputs of the error amplifier 108 decrease from $V_{CC}$ to $V_{CV}$. Ideally, if both inputs are present instantaneously the constant-current circuit 300 becomes inactive and the constant-voltage circuit 500 becomes immediately active. But the inputs to the error amplifier 108 change independently until the constant-voltage circuit 500 stabilizes and the output of the error amplifier 108 driving the transistor 114 decreases to reach value of 0. Because the gate voltage drives the transistor 114, the current through the transistor 114 quickly increases in order to charge the battery 126 until the constant-voltage circuit 500 stabilizes. The current of the transistor 114 may reach twice the maximum current charge (see FIG. 7). This may cause irreversible damage if the package is not able to dissipate excess power.

Charging System with a Diode

Figure 6:
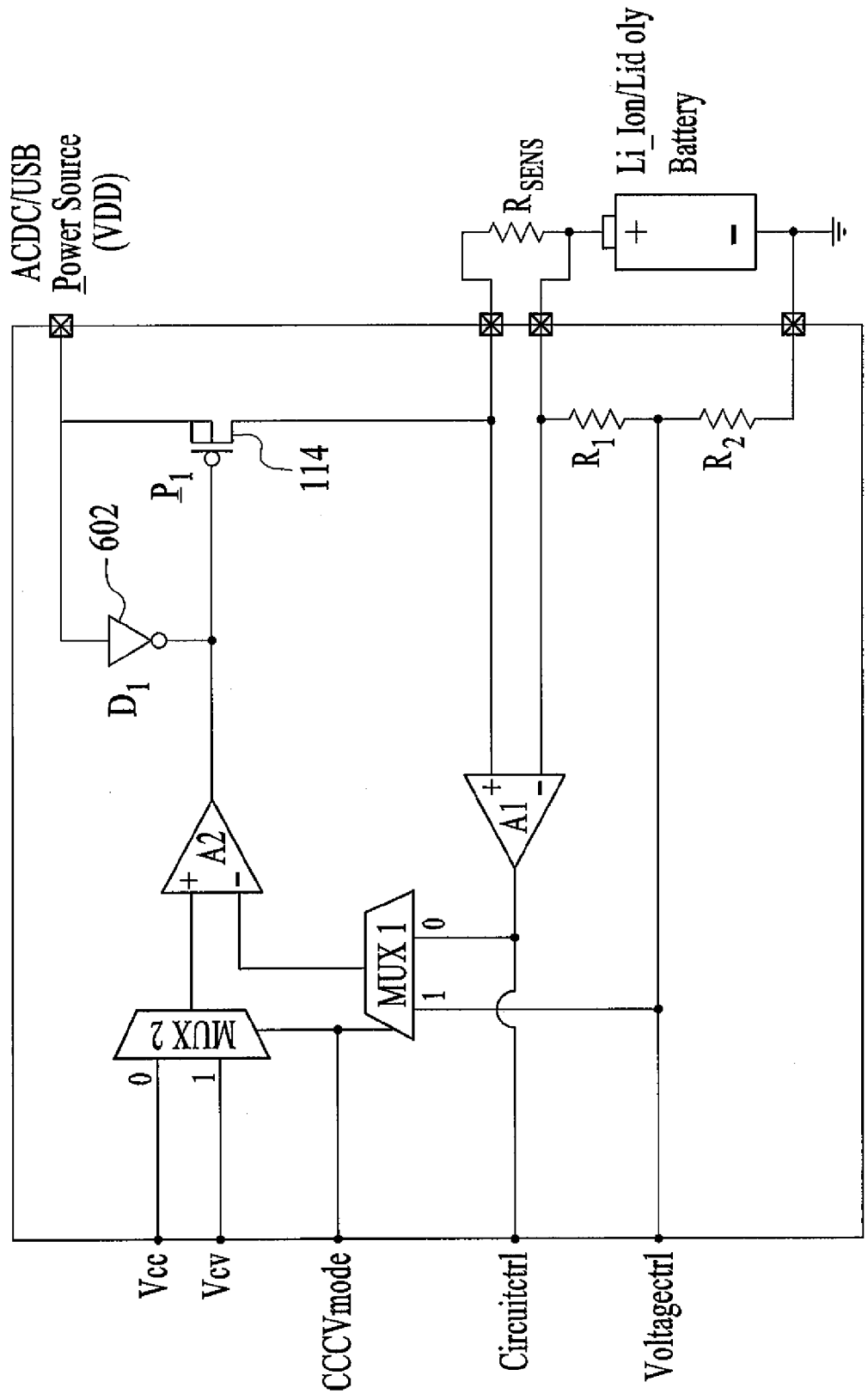
FIG. 6 is a schematic diagram of a charging system in accordance with another embodiment.

FIG. 6 is a schematic diagram of a charging system 600 in accordance with another embodiment. The charging system 600 is similar to the charging system 100 of FIG. 1 except that the charging system 600 includes a diode 602. As FIG. 6 shows, the diode 602 is coupled between the power source (e.g., ACDC/USB) and the gate of transistor 114. In operation, the diode 602 limits the voltage at the gate of the transistor 114 by ensuring that the drop between the power source and the gate of the transistor 114 is, in the worst case, limited to at least a diode voltage (roughly, 0.6V). This is in order to limit voltage at the amplifier output such that it decreases and reaches 0 volts. In one embodiment, two or more diodes may be utilized if more than a 0.6V drop is required. For example, two diodes coupled in series would allow a maximum voltage drop of 1.2V. Three diodes in series would allow a maximum voltage drop of 1.8V.

Figure 7:
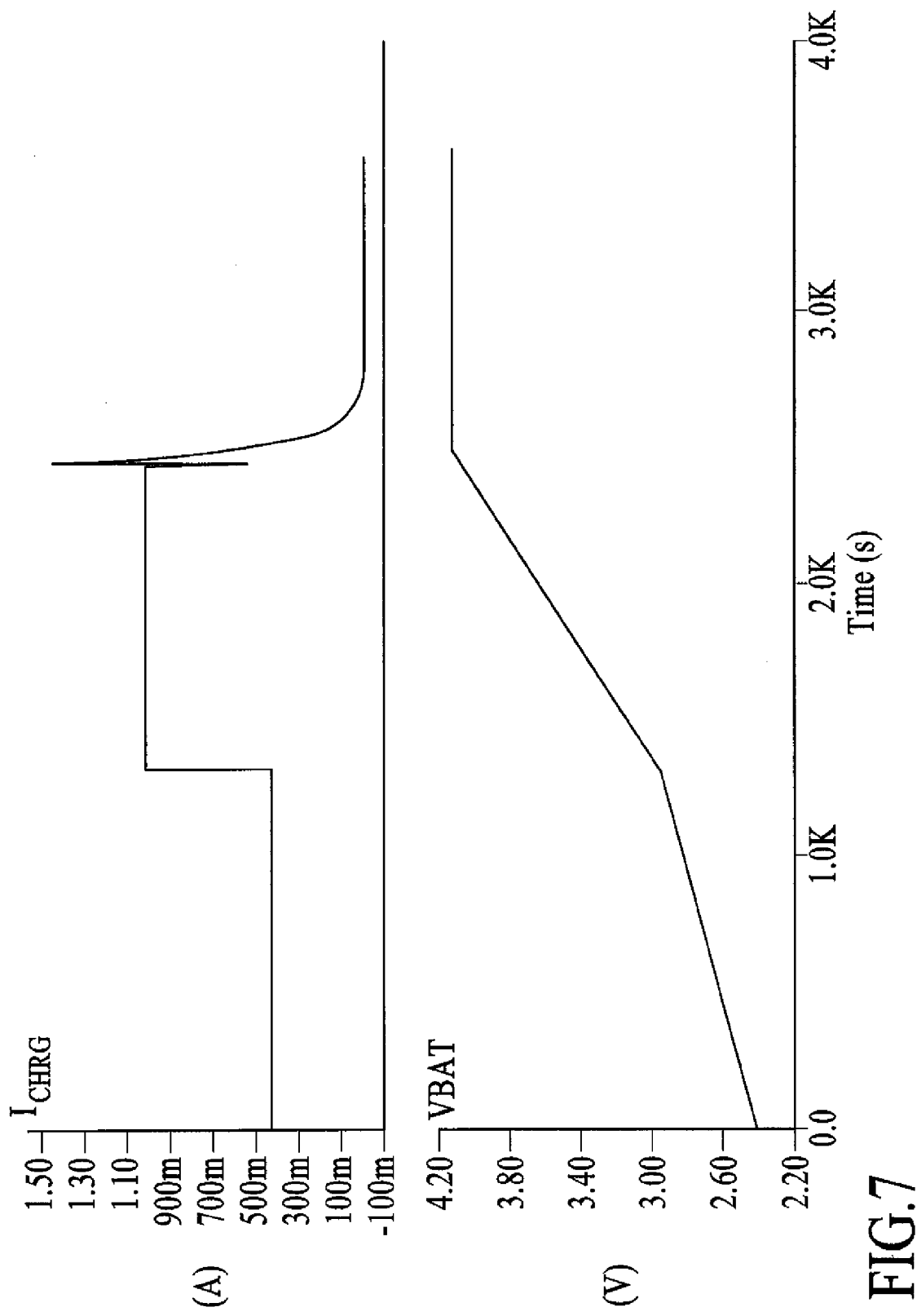
FIG. 7 shows example charging results obtained by adding a diode.
Figure 8:
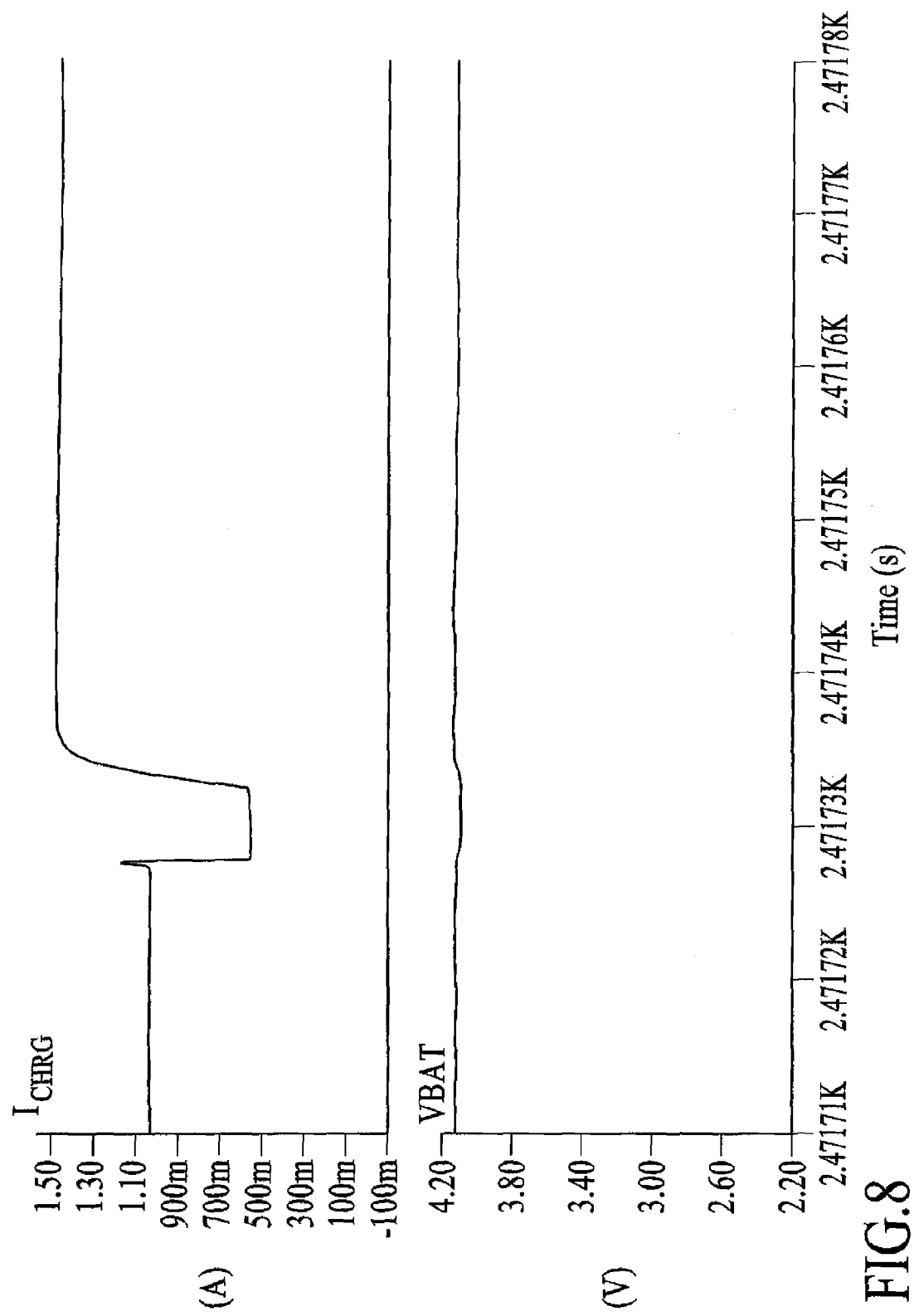
FIG. 8 shows more example charging results obtained by adding the diode.

One potential issue is that for operations requiring a larger voltage, the gate of the transistor 114 may require more than one diode. Accordingly, the gate voltage may decrease to −1.2V compared to VDD even if the gate voltage required to drive the transistor 114 is at most 0.7V (just above 0.6 V). Accordingly, an excess voltage of 0.5V exists (1.2V-0.7V). During a transition, the charge current may significantly increase due to previous excess voltage and consequently causes damage to the charging circuit. A mismatch between the diode 602 and the transistor 114 due to process variations and/or temperature may also introduce such problems. FIGS. 7 and 8 show example charging results obtained by adding the diode 602.

Charging System with Digital Control

Figure 9:
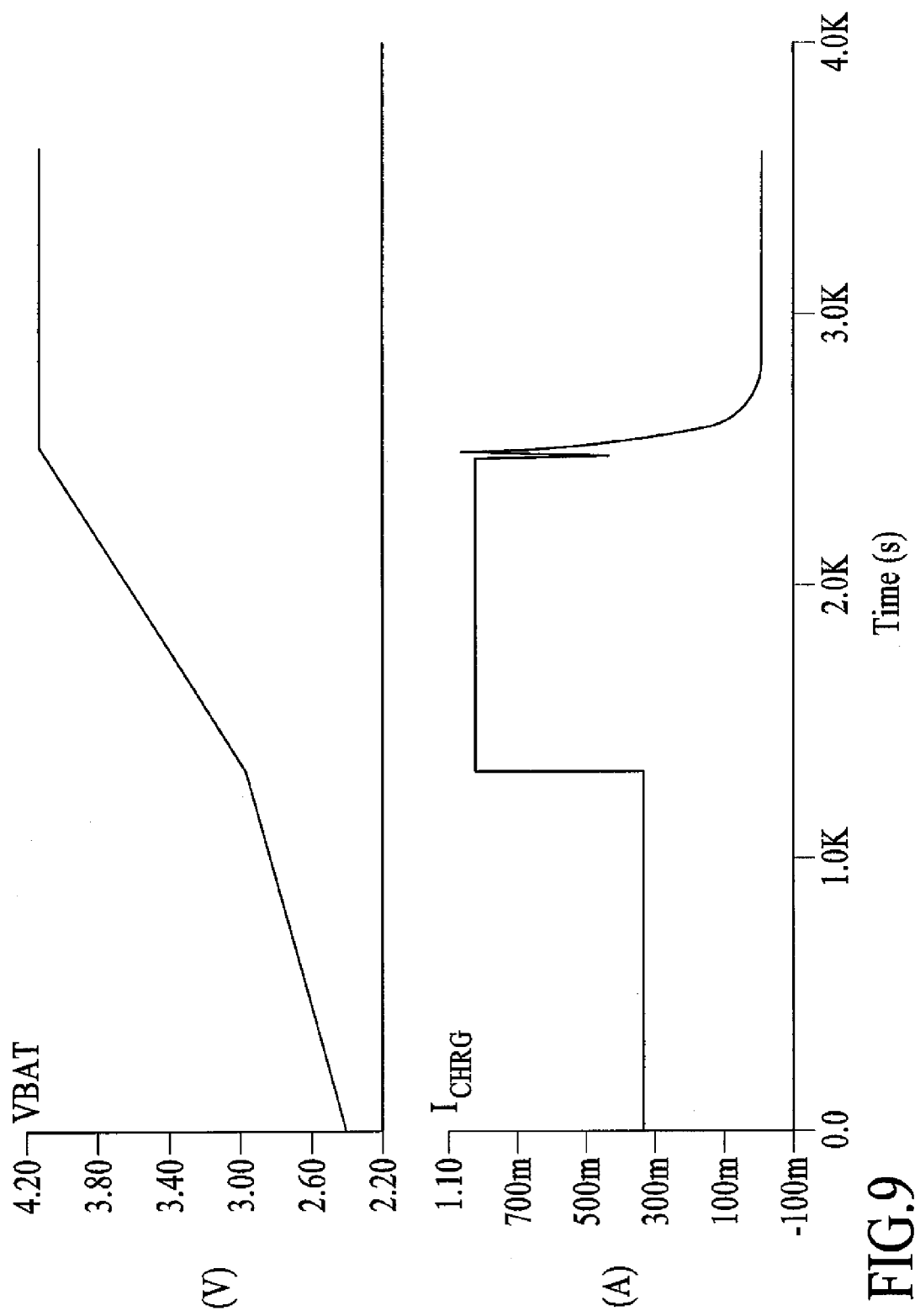
FIG. 9 shows example charging results obtained by applying digital control timing.
Figure 10:
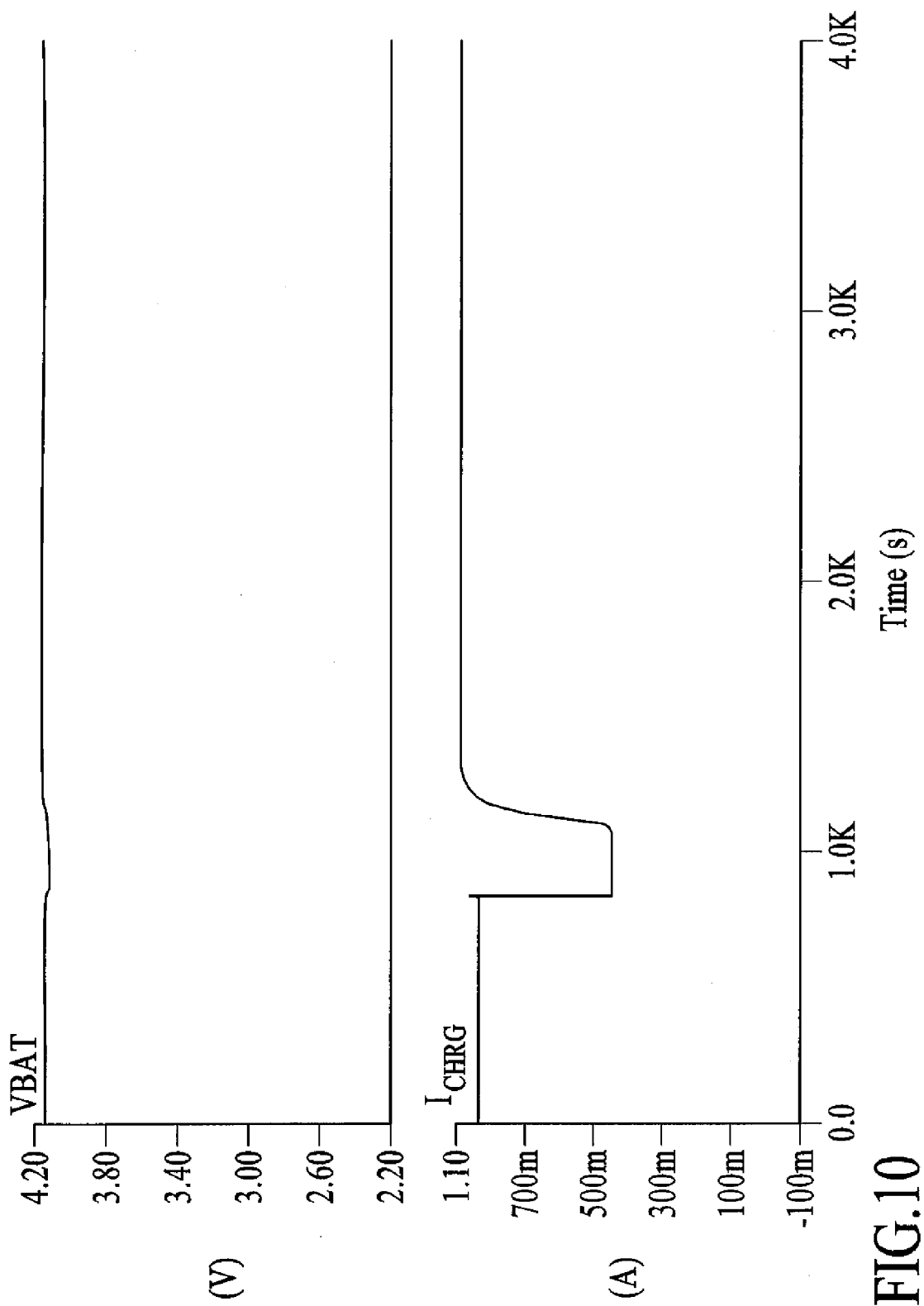
FIG. 10 shows more example charging results obtained by applying digital control timing.

Another optimization that provides better control of the charge current is performed by reducing the time during which the constant-current circuit is still active. This may be achievable using a digital control. When $V_{BAT}$ reaches its nominal battery value, a digital signal may immediately change the signal cccvmode from a logical "0" to logical "1." As such, the constant-current circuit 300 would be active for at most one clock cycle. Nevertheless, an open-loop configuration is possible even for a short time duration. Moreover, since the loop is characterized by a given constant time, an open-loop configuration may be more important than one clock cycle. FIGS. 9 and 10 show example charging results obtained by applying digital control timing.

Charging System with Memory Point Circuit and Smooth Transition Control Circuit

Figure 11:
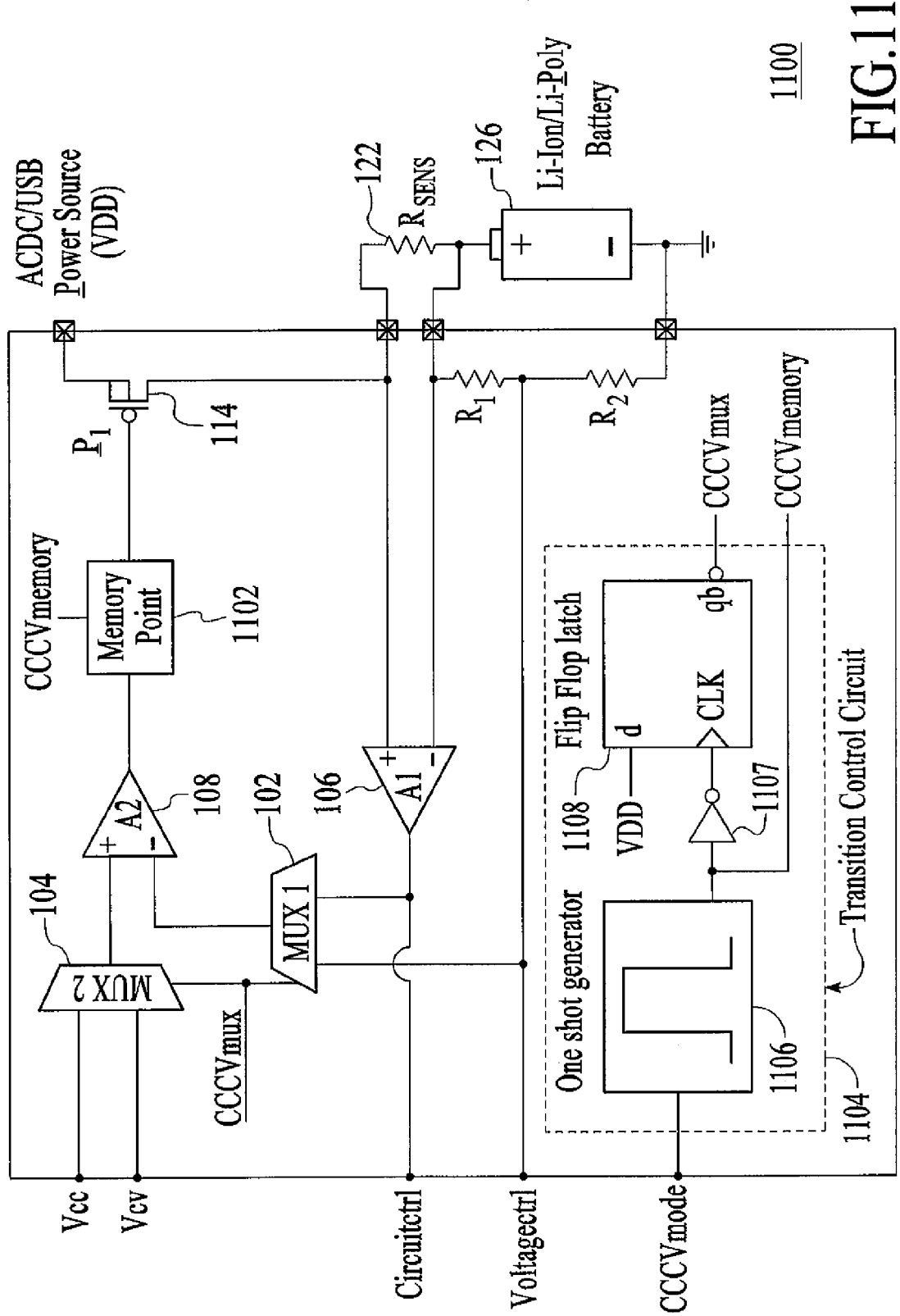
FIG. 11 is a schematic diagram of a charging system in accordance with another embodiment.

FIG. 11 is a schematic diagram of a charging system 1100 in accordance with another embodiment. The charging system 1100 of FIG. 11 is similar to the charging system 100 of FIG. 1, except that the charging system 1100 includes a memory point circuit 1102 and a transition control circuit 1104. In one embodiment, the transition control circuit 1104 includes a one-shot generator 1106, an inverter 1107, and a flip-flop latch 1108.

As described in more detail below, the memory point circuit 1102 and a transition control circuit 1104 enable smooth transitions from a constant-current mode to the constant-voltage mode by minimizing current glitches and/or voltage glitches during the transition. More specifically, in operation, generally, the charging system 1100 maintains the voltage at the gate of the transistor 114 during the transition from the constant-current mode to the constant-voltage mode. More specifically, the memory point circuit 1102 provides a dedicated control signal that stores the voltage at the gate of the transistor 114 or any other excess voltage. The control signal is generated from the input signal cccvmode by the transition control circuit, which generates cccvmux allowing to control the mux 104 and the memory point circuit 1102.

Figure 12:
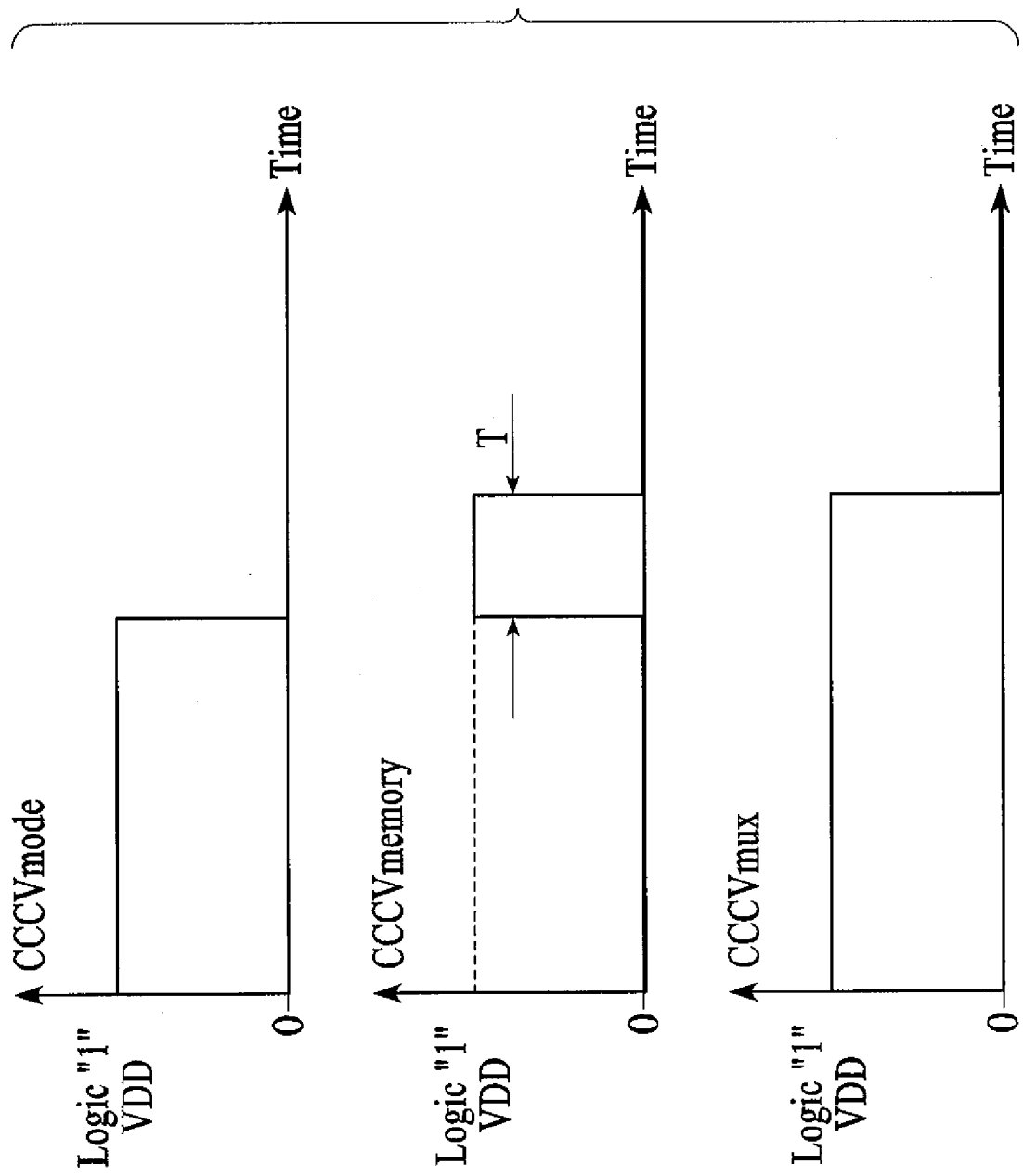
FIG. 12 shows a detailed diagram of generated signal control.

FIG. 12 shows a timing diagram of cccvmode, cccvmux and cccvmemory signals. As FIG. 12 shows, when the transition from constant-current mode to constant-voltage mode occurs, the signal cccvmode goes from a logical "1" to a logical "0." In one embodiment, the smooth transition control circuit 1104 receives the signal cccvmode and the one-shot generator 1106 generates a single pulse signal, which drives the memory point circuit 1102.

Figure 13A:
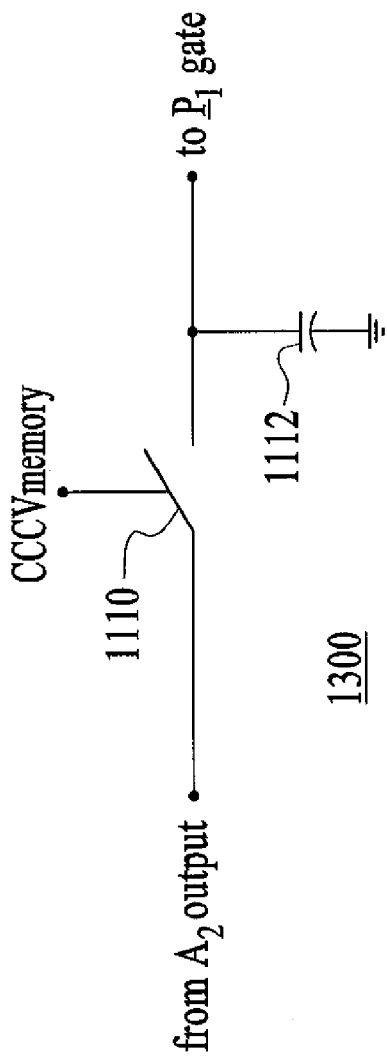
FIG. 13A is a conceptual schematic diagram of a memory point circuit, which may be used to implement the memory point circuit of FIG. 11, in accordance with one embodiment.

FIG. 13A is a conceptual schematic diagram of a memory point circuit 1300, which may be used to implement the memory point circuit 1102 of FIG. 11. As FIG. 13A shows, the memory point 1300 may include a switch 1110 and a capacitor 1112. In one embodiment, the switch 1110 may be controlled by the signal cccvmemory, which is generated by the one-shot signal generator 1106.

Figure 13B:
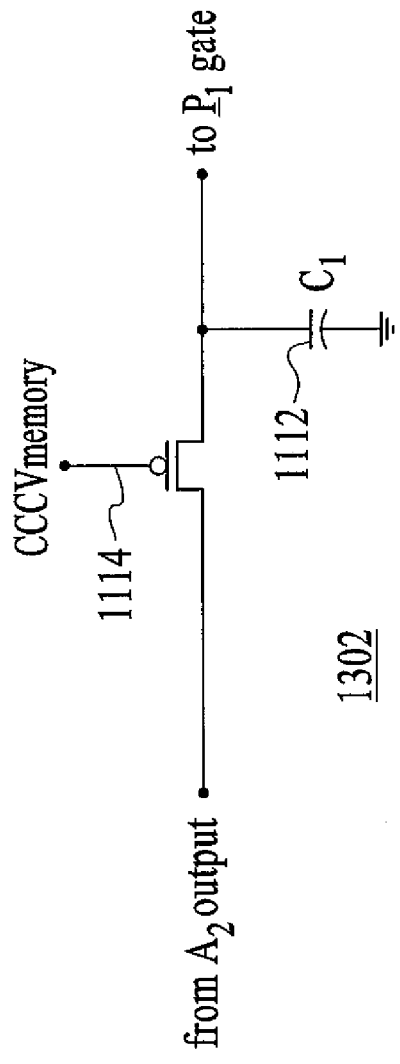
FIG. 13B is a transistor level schematic of a memory point circuit, which may be used to implement the memory point circuit of FIG. 11, in accordance with another embodiment.

FIG. 13B is a schematic diagram of a memory point circuit 1302, which may be used to implement the memory point circuit 1102 of FIG. 11. The memory point circuit 1302 of FIG. 13B is similar to the memory point circuit 1300 to FIG. 13A, except that the memory point circuit 1302 of FIG. 13B has a transistor 1114 that is used to implement the switch 1110. The transistor 1114 may be a PMOS transistor or an NMOS transistor.

Referring both FIGS. 12 and 13A, during a given time T, the switch 1110 is open and the stored voltage of the capacitor 1112 drives the gate of the transistor 114 (FIG. 11). After time T, the signal cccvmemory goes to a logical "0." The flip-flop latch 1108 becomes active on a falling edge of the signal cccvmemory and generates a signal cccvmux, which goes from a logical "1" to a logical "0," similar to the signal cccvmode, but delayed by the time T. The signal cccvmux controls the mux 104 such that the mux 104 outputs the $V_{CV}$. As a result, the constant-current circuit goes inactive and the charge is continuous during the constant-voltage mode.

Figure 14:
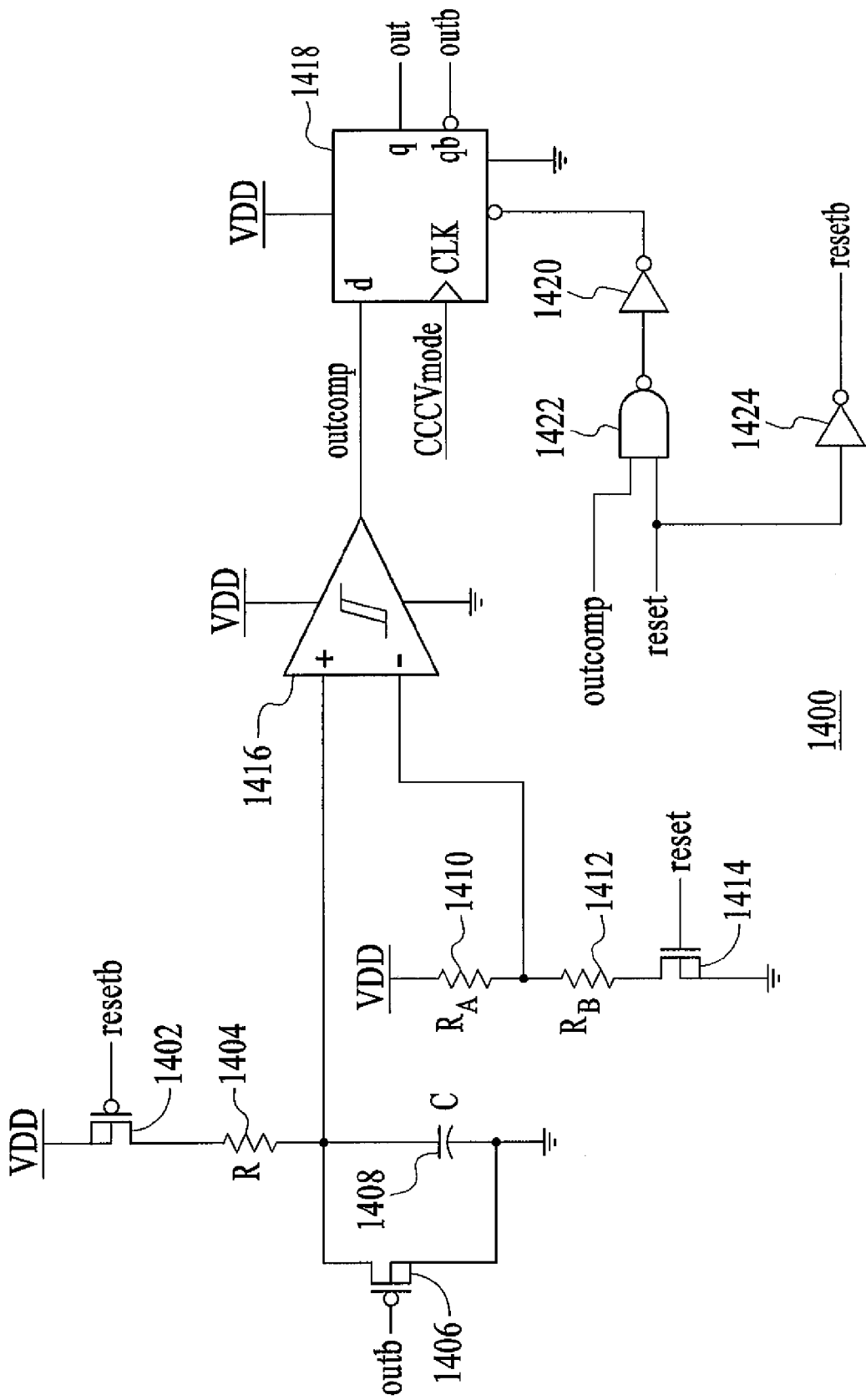
FIG. 14 is a schematic diagram of a one-shot signal generator.

FIG. 14 is a schematic diagram of a one-shot signal generator 1400. In one embodiment, the one-shot generator 1400 generates a one shot signal with a given duration. This duration maintains an open switch 1110 (FIG. 13A) and allows voltage stored on the capacitor 1112 to drive the gate of transistor 114 (FIG. 1). The period T of the one-shot signal shown in the timing diagram (FIG. 12) is given by: T=RC*Ln (1+RB/RA), where RB, RA, R and C are detailed in FIG. 14.

Figure 15:
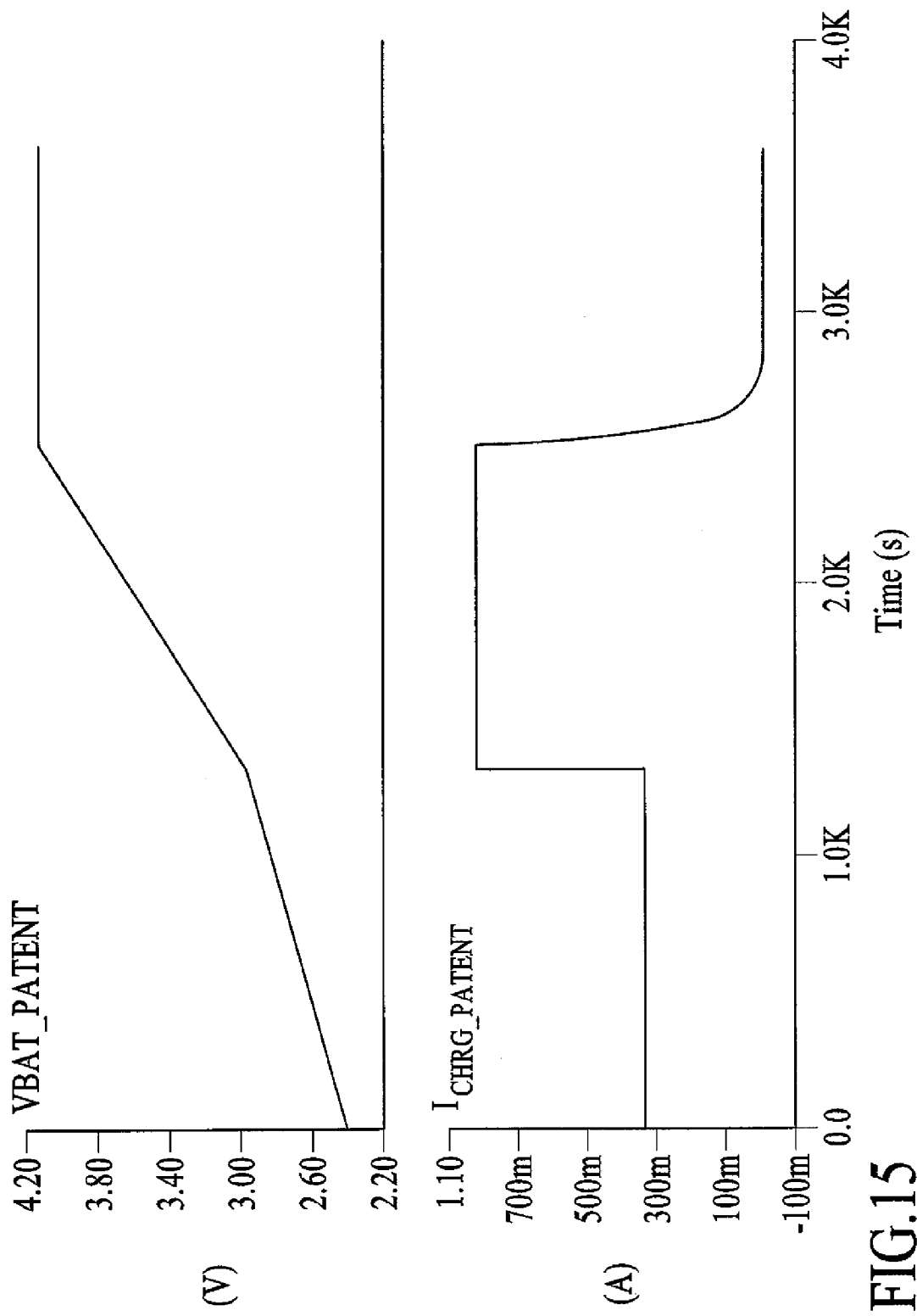
FIG. 15 shows example charging results of the charging system of FIG. 11.

FIG. 15 shows example charging results of the charging system of FIG. 11. As FIG. 15 shows, the charging system of FIG. 11 eliminates glitches that may occur (as in FIG. 7 and FIG. 9) during transition from constant-current mode to constant-voltage mode. Referring to the lower graph, after the transition from the constant-current mode to constant-voltage mode, the current properly drops. Referring upper graph, after the transition from the constant-current mode to constant-voltage mode, the voltage is constant without any glitches.

According to the system and method disclosed herein, the embodiments provide numerous benefits. For example, embodiments eliminate glitches that may occur during transition from constant-current mode to constant-voltage mode. Embodiments of the present invention also improve accuracy and robustness of a charging system.

A system and method for charging a battery has been disclosed. The system includes a charging circuit that charges the battery with a constant current during a first phase, and charges the battery with a constant voltage during a second phase. The system also includes a control circuit that minimizes glitches while the charging transitions from the first phase to the second phase. As a result, a battery may be charged in a controlled and reliable manner.

The present invention has been described in accordance with the embodiments shown. One of ordinary skill in the art will readily recognize that there could be variations to the embodiments, and that any variations would be within the spirit and scope of the present invention. Accordingly, many modifications may be made by one of ordinary skill in the art without departing from the spirit and scope of the appended claims.

What is claimed is:

1. A system for charging a battery, the system comprising:
   a charging circuit configured to charge the battery with a constant current during a first phase and to charge the battery with a constant voltage during a second phase; and
   a control circuit coupled to the charging circuit, the control circuit configured to suppress glitches when the charging circuit transitions from the first phase to the second phase, the control circuit comprising a one-shot generator and a flip-flop latch coupled to the one-shot generator.

2. A system for charging a battery, the system comprising:
   a charging circuit configured to charge the battery with a constant current during a first phase and to charge the battery with a constant voltage during a second phase; and
   a control circuit coupled to the charging circuit, the control circuit configured to suppress glitches when the charging circuit transitions from the first phase to the second phase, wherein the charging circuit further comprises:
   a transistor configured to provide a charge current to the battery; and
   a voltage storage circuit to store a voltage at a gate of the transistor.

3. A system for charging a battery, the system comprising:
   a charging circuit configured to charge the battery with a constant current during a first phase and to charge the battery with a constant voltage during a second phase; and
   a control circuit coupled to the charging circuit, the control circuit configured to suppress glitches when the charging circuit transitions from the first phase to the second phase, wherein the charging circuit further comprises:
   a transistor configured to couple between a power source and the battery;
   an amplifier coupled to a gate of the transistor; and
   a current-to-voltage converter coupled between the transistor and the battery.

4. The system of claim 3 wherein the charging circuit further comprises:
   a first multiplexer coupled between an output of the converter and a first input of the amplifier; and
   a second multiplexer coupled to a second input of the amplifier.

5. The system of claim 3 wherein the charging circuit further comprises a voltage divider coupled between the current-to-voltage converter, the battery, and the first multiplexer.

6. A system for charging a battery, the system comprising:
   a charging circuit to charge the battery with a constant current during a first phase and to charge the battery with a constant voltage during a second phase; and
   a control circuit coupled to the charging circuit, the control circuit for minimizing glitches when the charging circuit transitions from the first phase to the second phase, and wherein the control circuit comprises:
   a one-shot generator; and
   a flip-flop latch coupled to the one-shot generator.

7. The system of claim 6 wherein the charging circuit further comprises:
   a transistor to provide a charge current to the battery; and a voltage storage circuit to store a voltage at a gate of the transistor.

8. The system of claim 6 wherein the charging circuit comprises:
   a transistor configured to couple between a power source and the battery;
   an amplifier coupled to a gate of the transistor; and
   a current-to-voltage converter coupled between the transistor and the battery.

9. The system of claim 8 wherein the charging circuit further comprises:
   a first multiplexer coupled between an output of the current-to-voltage converter and a first input of the amplifier; and
   a second multiplexer coupled to a second input of the amplifier.

10. The system of claim 8 wherein the charging circuit further comprises a voltage divider coupled between the converter and the battery.

11. A method for charging a battery, the method comprising:
    charging the battery with a constant current during a first phase using a charging circuit;
    charging the battery with a constant voltage during a second phase using the charging circuit; and
    suppressing glitches using a control circuit when transitioning from the first phase to the second phase, the control circuit coupled to the charging circuit and including a one-shot generator and a flip-flop latch coupled to the one-shot generator.

12. The method of claim 11, wherein suppressing glitches comprises maintaining a voltage level at a gate of a transistor coupled between a power supply and the battery during a transition phase.

13. The method of claim 12, wherein the transition phase comprises a period of time sufficient to allow the constant voltage to stabilize.

14. The method of claim 11, wherein suppressing glitches comprises minimizing over-voltage conditions or current spikes applied to the battery.

15. The method of claim 11, wherein suppressing glitches comprises:
    receiving a mode selection signal at the control circuit, the mode selection signal indicating a transition from the first phase to the second phase;
    generating a pulse using the one-shot generator; and
    applying the pulse to a gate of a transistor coupled between a power supply and the battery.

16. The method of claim 15, further comprising:
    inverting the pulse to clock a voltage level into the flip-flop latch; and
    selecting between inputs of at least one multiplexer circuit coupled to the gate based on an inverted output of the flip-flop latch.

17. The system of claim 1, wherein the charging circuit comprises:
    a transistor including a first terminal coupled to a power supply, a second terminal, and a gate terminal;
    a sense resistor coupled between the second terminal and the battery;
    a first amplifier configured to measure a differential voltage across the sense resistor;

a first multiplexer including a first multiplexer input coupled to an output of the first amplifier, a second multiplexer input, and a first selection input coupled to the control circuit;

a second multiplexer; and a second amplifier including a first amplifier input coupled to a first multiplexer output of the first multiplexer and a second amplifier input coupled to a second multiplexer output of the second multiplexer, the second amplifier including an output coupled to the gate terminal of the transistor.

18. The system of claim 17, further comprising:

a voltage divider circuit coupled between the second terminal of the transistor and an electrical ground, the voltage divider circuit comprising:

a first resistor coupled between the sense resistor and a node; and a second resistor coupled between the node and the electrical ground;

wherein the node is coupled to the second multiplexer input of the first multiplexer.

\* \* \* \* \*